US007876263B2

(12) United States Patent
Quan

(10) Patent No.: US 7,876,263 B2
(45) Date of Patent: Jan. 25, 2011

(54) ASYMMETRICALLY THINNED ACTIVE ARRAY TR MODULE AND ANTENNA ARCHITECTURE

(75) Inventor: Clifton Quan, Arcadia, CA (US)

(73) Assignee: Raytheon Company, Waltham, MA (US)

( * ) Notice: Subject to any disclaimer, the term of this patent is extended or adjusted under 35 U.S.C. 154(b) by 132 days.

(21) Appl. No.: 12/391,984

(22) Filed: Feb. 24, 2009

(65) Prior Publication Data

US 2010/0214170 A1 Aug. 26, 2010

(51) Int. Cl.
*H01Q 3/02* (2006.01)
*G01S 13/00* (2006.01)

(52) U.S. Cl. .................................... 342/374; 342/154

(58) Field of Classification Search ................ 342/374, 342/154
See application file for complete search history.

(56) References Cited

U.S. PATENT DOCUMENTS 5,027,125 A 6/1991 Tang
5,270,719 A * 12/1993 Roth .......................... 342/157
5,339,083 A * 8/1994 Inami .......................... 342/157
5,493,305 A * 2/1996 Wooldridge et al. ........ 342/368
6,097,335 A 8/2000 Cassen et al.
6,611,180 B1 8/2003 Puzella et al.
6,961,025 B1 11/2005 Chethik et al.
6,992,629 B2 1/2006 Kerner et al.
7,138,937 B1 11/2006 Macdonald
7,205,934 B2 4/2007 Hall
7,394,424 B1 7/2008 Jelinek et al.
2004/0192392 A1 9/2004 Hoppenstein et al.
2004/0204109 A1 10/2004 Hoppenstein
2008/0030420 A1 2/2008 Lee et al.
2008/0088519 A1 4/2008 Quan et al.
2008/0316101 A1 12/2008 Brown et al.
2009/0167409 A1 * 7/2009 Suko et al. .................. 327/427

FOREIGN PATENT DOCUMENTS

EP 0 537 760 A2 5/1993

OTHER PUBLICATIONS

"Beamforming"; http://en.wikipedia.org/wiki/Beamformer; Nov. 23, 2008; 5 pgs.

"Circulator"; http://en.wikipedia.org/wiki/Circulator; Nov. 28, 2008; 2 pgs.

(Continued)

*Primary Examiner*—Thomas H Tarcza
*Assistant Examiner*—Harry Liu
(74) *Attorney, Agent, or Firm*—Christie, Parker & Hale, LLP

(57) ABSTRACT

An asymmetrically thinned transmit/receive (TR) module and antenna architecture is provided. In one embodiment, the invention relates to an active antenna assembly including at least one multi-channel transmit/receive (TR) module for reducing power consumption, the antenna assembly including the at least one TR module including a first phase shifter, a first switch coupled to the first phase shifter, the first switch configured to switch between a transmit circuit and a receive circuit, the transmit circuit including a plurality of first power amplifiers coupled to the first switch, the receive circuit including a low noise amplifier coupled to the first switch and to a plurality of second switches, where each of the plurality of second switches is configured to switch between one of the plurality of first power amplifiers and the low noise amplifier.

17 Claims, 6 Drawing Sheets

OTHER PUBLICATIONS

"Power dividers and directional couplers"; http://en.wikipedia.org/wiki/Power_divider; Nov. 29, 2008; 8 pgs.
"Stripline"; http:en.wikipedia.org/wiki/Stripline; Dec. 2, 2008; 2 pgs.
"Understanding the Basics of the Wafer-Level Chip-Scale Package (WL-CSP)"; Maxim Integrated Products; May 1, 2008; 12 pgs.
Parker, et al., "Phased Arrays - Part I: Theory and Architectures, IEEE Transactions on Microwave Theory and Techniques," vol. 50, No. 3, Mar. 2002, pp. 678-687.
Extended European Search Report for Corresponding European Application No. 10250323.2, extended European Search Report dated Sep. 20, 2010 and mailed Sep. 28, 2010 (10 pgs.).

* cited by examiner 4 to 1 TR Module Thinning in Elevation 4 to 1 TR Module Thinning in Azimuth 2 to 1 TR Module Thinning in Azimuth &
2 to 1 TR Module Thinning in Elevation FIG. 10
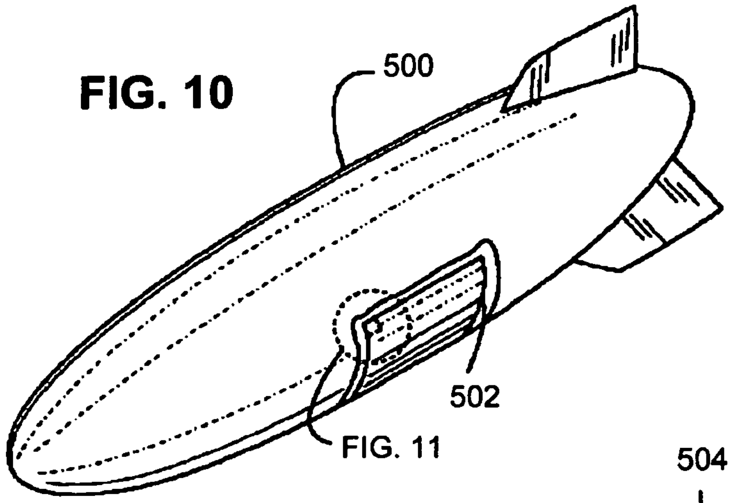
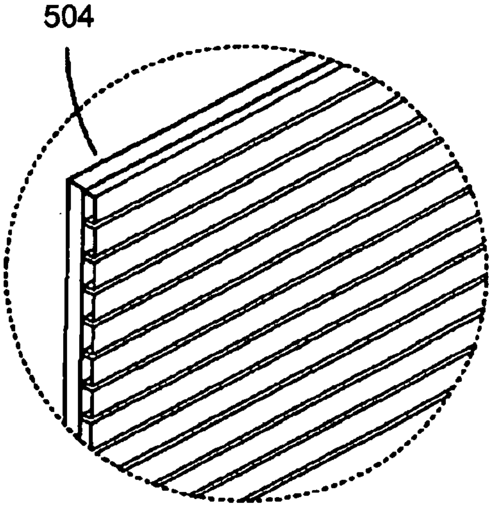
FIG. 11

ASYMMETRICALLY THINNED ACTIVE ARRAY TR MODULE AND ANTENNA ARCHITECTURE

STATEMENT REGARDING FEDERALLY SPONSORED RESEARCH OR DEVELOPMENT

This invention was made with Government support from the Defense Advanced Research Projects Agency (DARPA) for the Integrated Sensor Is Structure (ISIS) program and under contract number FA8750-06-C-0048. The U.S. Government has certain rights in this invention.

FIELD OF THE INVENTION

The present invention relates generally to radar and communication systems. More specifically, the invention relates to a radar or communication system including an asymmetrically thinned transmit/receive (TR) module and antenna architecture that features fewer components than conventional TR modules.

BACKGROUND

Large area multifunction active arrays are used in radar and communication systems. In radar systems, the active arrays use electromagnetic waves to identify the range, altitude, direction, or speed of both moving and fixed objects such as aircraft, ships, motor vehicles, weather formations, and terrain. Active array antennas are typically electrically steerable. Thus, unlike mechanical arrays, active arrays are capable of steering the electromagnetic waves without physical movement. As active array antennas do not require systems for antenna movement, they are less complex (e.g., no moving parts), are more reliable, and require less maintenance than their mechanical counterparts. Other advantages over mechanically scanned arrays include a fast scanning rate, substantially higher range, ability to track and engage a large number of targets, low probability of intercept, ability to function as a radio/jammer, and simultaneous air and ground modes.

Active array antennas include a number of transmit/receive (TR) modules for transmitting and receiving electromagnetic waves, and a number of radiating elements. Typically, there is one TR module for each antenna radiating element. Each TR module generally includes a power amplifier (PA) for transmitting electromagnetic waves, a low noise amplifier (LNA) for receiving electromagnetic waves, a phase shifter for changing phase angles of the electromagnetic waves and transmit/receive (TR) switches for toggling transmit or receive functions. An example of a conventional active array antenna architecture including multiple conventional TR modules can be found in U.S. Pat. Publ. No. 2008/0088519, the entire content of which is expressly incorporated herein by reference. Other examples of conventional TR modules can be found in U.S. Pat. No. 5,339,083 to Inami and U.S. Pat. No. 6,992,629 to Kerner et al., the entire content of each reference document is expressly incorporated herein by reference.

Conventional TR modules for active arrays dissipate substantial power and include expensive components that contribute to antenna weight. Passive electronically scanned arrays (ESA) that use MEMS and varactor type phase shifters dissipate little power but have a high noise figure due to losses associated with the phase shifters and the associated RF feed network. In conventional active arrays, the noise figure is set by the LNA and loss in the path before the LNA. However, the collective power dissipation associated with conventional TR modules and their LNAs is often too high to meet the requirements of new applications. Future applications of active array antennas require reduced power dissipation, reduced cost, and reduced weight.

SUMMARY OF THE INVENTION

Aspects of the invention relate to an asymmetrically thinned transmit/receive (TR) module and antenna architecture. In one embodiment, the invention relates to an active antenna assembly including at least one multi-channel transmit/receive (TR) module for reducing power consumption, the antenna assembly including the at least one TR module including a first phase shifter, a first switch coupled to the first phase shifter, the first switch configured to switch between a transmit circuit and a receive circuit, the transmit circuit including a plurality of first power amplifiers coupled to the first switch, the receive circuit including a low noise amplifier coupled to the first switch and to a plurality of second switches, where each of the plurality of second switches is configured to switch between one of the plurality of first power amplifiers and the low noise amplifier.

In some embodiments, the active antenna assembly further includes a plurality of second phase shifters, each second phase shifter coupled to one of the second switches, and a plurality of radiating elements, each radiating element coupled to one of the second phase shifters.

In another embodiment, the invention relates to a multi-channel transmit/receive (TR) module for reducing power consumption on receive, the TR module including a first phase shifter, a first switch coupled to the first phase shifter, the first switch configured to switch between a transmit circuit and a receive circuit, the transmit circuit including four first power amplifiers, and a power divider circuit for coupling the first switch to the four first power amplifiers, and the receive circuit including a low noise amplifier coupled to the first switch, and a power combiner circuit for coupling the low noise amplifier to four second switches, where each of the four second switches is configured to switch between one of the first power amplifiers and the power combiner circuit.

BRIEF DESCRIPTION OF THE DRAWINGS

FIG. 10 is a isometric view of an airship including an active array assembly having multiple TR modules in accordance with one embodiment of the present invention.

FIG. 11 is an exploded isometric view of a portion of the active array assembly of FIG. 10.

DETAILED DESCRIPTION OF THE INVENTION

Figure 1A:
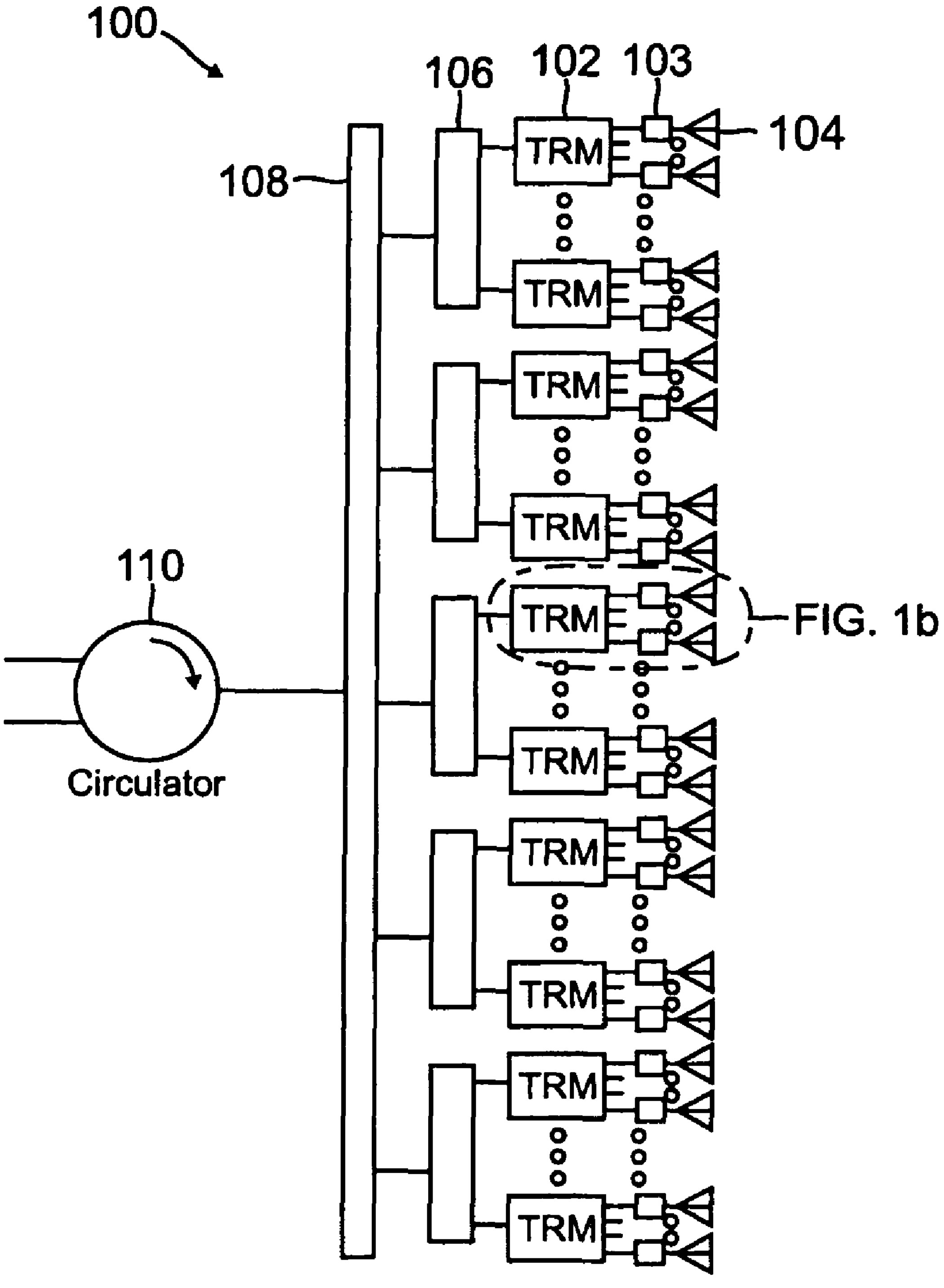
FIG. 1*a* is a schematic block diagram illustrating an active array antenna architecture including a plurality of asymmetrically thinned four channel TR modules in accordance with one embodiment of the present invention.

Referring to the drawings, embodiments of asymmetrically thinned multi-channel transmit/receive (TR) modules include fewer components than conventional multi-channel TR modules. The improved TR modules therefore are less expensive, dissipate less power and weigh less than conventional TR modules. Embodiments of improved TR modules include separate internal beamforming networks for transmit and receive paths, multiple power amplifiers for amplifying signals in the transmit path, multiple phase shifters for changing phase angle, and multiple TR switches for switching between beamforming networks. Embodiments of improved TR modules eliminate low noise amplifiers (LNAs) and phase shifters generally required for conventional TR modules. These improved TR modules can be implemented in multilayer assemblies. In one embodiment, the improved TR modules are implemented in a three layer assembly where the beamforming networks are located on different layers. In another embodiment, the improved TR modules are implemented in a two layer assembly where the beamforming networks are located on different layers.

FIG. 1*a* is a schematic block diagram of an active array antenna architecture 100 including a plurality of asymmetrically thinned four channel TR modules 102 in accordance with one embodiment of the present invention. The antenna architecture 100 further includes a circulator 110 coupled to a planar RF feed unit 108, which is coupled to five first level RF feed units 106. The first level RF feed units 106 are coupled to the four channel TR modules 102. Each four channel TR module 102 is coupled to four secondary phase shifters 103. Each secondary phase shifter 103 is coupled to a radiating element 104.

In operation, the circulator 110 routes outgoing and incoming signals between the antenna, including components from the planar RF feed unit 108 to the radiating elements 104, a transmitter (not shown) and a receiver (not shown). The operation of circulators within antenna systems is well known in the art. For example, U.S. Pat. No. 6,611,180 to Puzella et al., the entire content of which is expressly incorporated herein by reference, describes a circulator assembly and operation thereof. In addition, U.S. Pat. No. 7,138,937 to Macdonald, the entire content of which is expressly incorporated herein by reference, describes another circulator system. In some embodiments, the transmitter and receiver operate in the X-Band, or in a range from approximately 7 to 12.5 gigahertz (GHz). The planar RF feed unit 108 and first level RF feed units 106 distribute and concentrate electromagnetic signals in the X-Band, while those electromagnetic signals are being transmitted and received, respectively.

In the illustrated embodiment, each TR module is coupled to four radiating elements via four secondary phase shifters. In other embodiments, each TR module can be coupled to more than or less than four radiating elements via a corresponding number of phase shifters. In some embodiments, each TR module can be coupled to a different number of radiating elements via a corresponding number of phase shifters. In the embodiment illustrated in FIG. 1*a,* a specific number of components for the antenna is shown. In other embodiments, more than or less than the specific number of antenna components illustrated can be used.

Figure 1B:
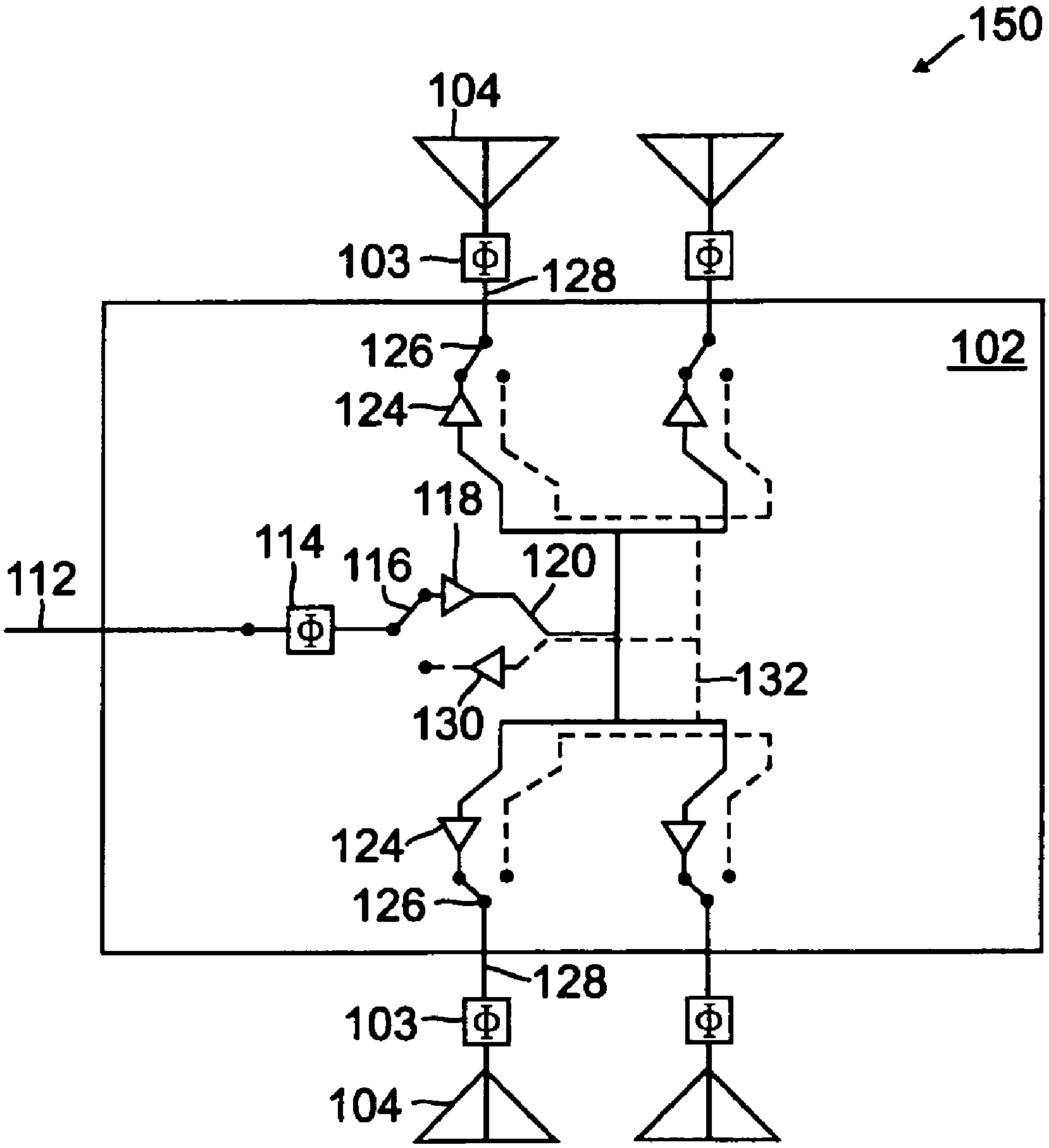
FIG. 1*b* is a schematic block diagram illustrating an assembly including one of the plurality of asymmetrically thinned four channel TR modules of FIG. 1*a*.

FIG. 1*b* is a schematic block diagram illustrating an assembly 150 including one of the plurality of asymmetrically thinned four channel TR modules of FIG. 1*a*. The TR module 102 is coupled to four radiating elements 104 via four secondary phase shifters 103. Signals to be transmitted first enter the TR module 102 at a RF feed input/output (I/O) 112, are then phase shifted by a primary phase shifter 114, are then switched to a transmit path by a primary TR switch 116, are then amplified by a primary power amplifier 118, and are then distributed to four separate channels via a transmit power divider circuit or beamforming network 120. Each of the four channels of the power divider circuit 120 then guides the transmit signals, in sequence, through a secondary power amplifier 124, a secondary TR switch 126 switched to the transmit path, a radiating I/O 128, and a secondary phase shifter 103 to a radiating element 104. Additional, characteristics of beamforming networks are described in U.S. Pat. No. 7,394,424 to Jelinek et al., the entire content of which is expressly incorporated herein by reference.

Signals received at each of the four radiating elements 104 are phase shifted by each of the four secondary phase shifters 103, then travel into the TR module 102 via a radiating I/O 128, and are switched at the secondary TR switch 126 to a receive power combiner circuit or beamforming network 132. The power combiner circuit 132 combines the signals received from all four of the channels (e.g., the four radiating elements 104 via phase shifters 103). The combined signal output of the power combiner circuit 132 is amplified by a low noise amplifier (LNA) 130 and then passes the primary TR switch 116 switched to the receive circuit. The received signals are then phase shifted by the primary phase shifter 114 and exit the TR module at the RF feed I/O 112. In some embodiments, the low noise amplifier is a special type of electronic amplifier typically used in communication systems to amplify weak signals captured by an antenna.

In the embodiment illustrated in FIG. 1*b,* two beamforming networks are used. In other embodiments, a single beamforming network can be used in conjunction with additional switches.

In some embodiments, the primary phase shifter 114 is a low loss and low power dissipating type phase shifter implemented using micro-electromechanical systems (MEMs) and/or varactor diode devices. In one such embodiment, the phase shifters prevent grating lobes when scanning an antenna beam. In one embodiment, the primary phase shifter 114 is a 180 degree phase shifter that is larger than the secondary phase shifters 103. In some embodiments, the secondary phase shifters 103 are 2 to 3 bit phase shifters, which can typically be smaller and less lossy than other phase shifters. In several embodiments, the secondary phase shifters include at least two phase bits.

Figure 2A:
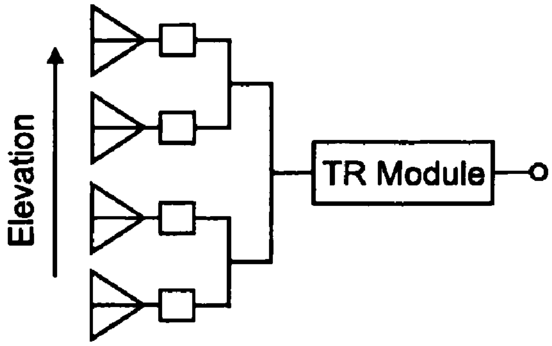
FIG. 2*a* is a schematic block diagram illustrating 4 to 1 TR module thinning in elevation in accordance with one embodiment of the present invention.
Figure 2B:
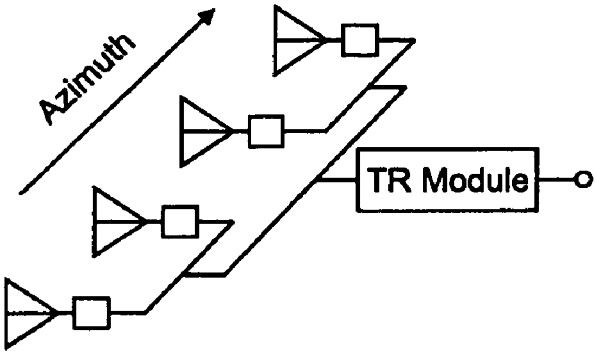
FIG. 2*b* is a schematic block diagram illustrating 4 to 1 TR module thinning in azimuth in accordance with one embodiment of the present invention.
Figure 2C:
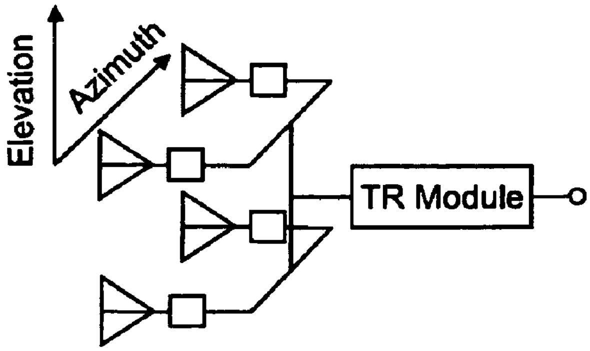
FIG. 2*c* is a schematic block diagram illustrating 2 to 1 TR module thinning in both azimuth and elevation in accordance with one embodiment of the present invention.

In some embodiments, the TR modules effectively provide 4 to 1 thinning by reducing the number of LNAs, phase shifters and/or other components typically required in conventional TR modules. In such case, the thinned TR modules can reduce receive power dissipation by up to 6 dB or more, can increase the receive noise figure, and can reduce phase shifter losses. FIG. 2*a* is a schematic block diagram illustrating 4 to 1 TR module thinning in elevation in accordance with one embodiment of the present invention. FIG. 2*b* is a schematic block diagram illustrating 4 to 1 TR module thinning in azimuth in accordance with one embodiment of the present invention. In some embodiments, the TR modules effectively provide 2 to 1 azimuth thinning and 2 to 1 elevation thinning, resulting in 4 to 1 thinning overall. FIG. 2*c* is a schematic block diagram illustrating 2 to 1 TR module thinning in both azimuth and elevation in accordance with one embodiment of the present invention. In a number of embodiments, the TR modules incorporate thinning in the receive path but no thinning in the transmit path.

In the illustrated embodiment, a four channel TR module is used to thin components generally required in conventional TR modules. In other embodiments, the improved TR modules can use more than or less than four channels to decrease power dissipation and improve overall performance. In one such embodiment, for example, the improved TR modules include just two channels. In another embodiment, the improved TR modules include eight channels.

The thinned TR modules can be used in a number of different array antenna assemblies. In specific embodiments, for example, the thinned TR modules can be used in a brick array, a co-planar tile array, and/or a laminated panel array. In other embodiments, the improved TR modules can be used in other active array antennas for radar or communication applications. In one embodiment, the improved TR modules can be used in any number of applications using one or more TR modules.

Figures 3, 4, 5, 6:
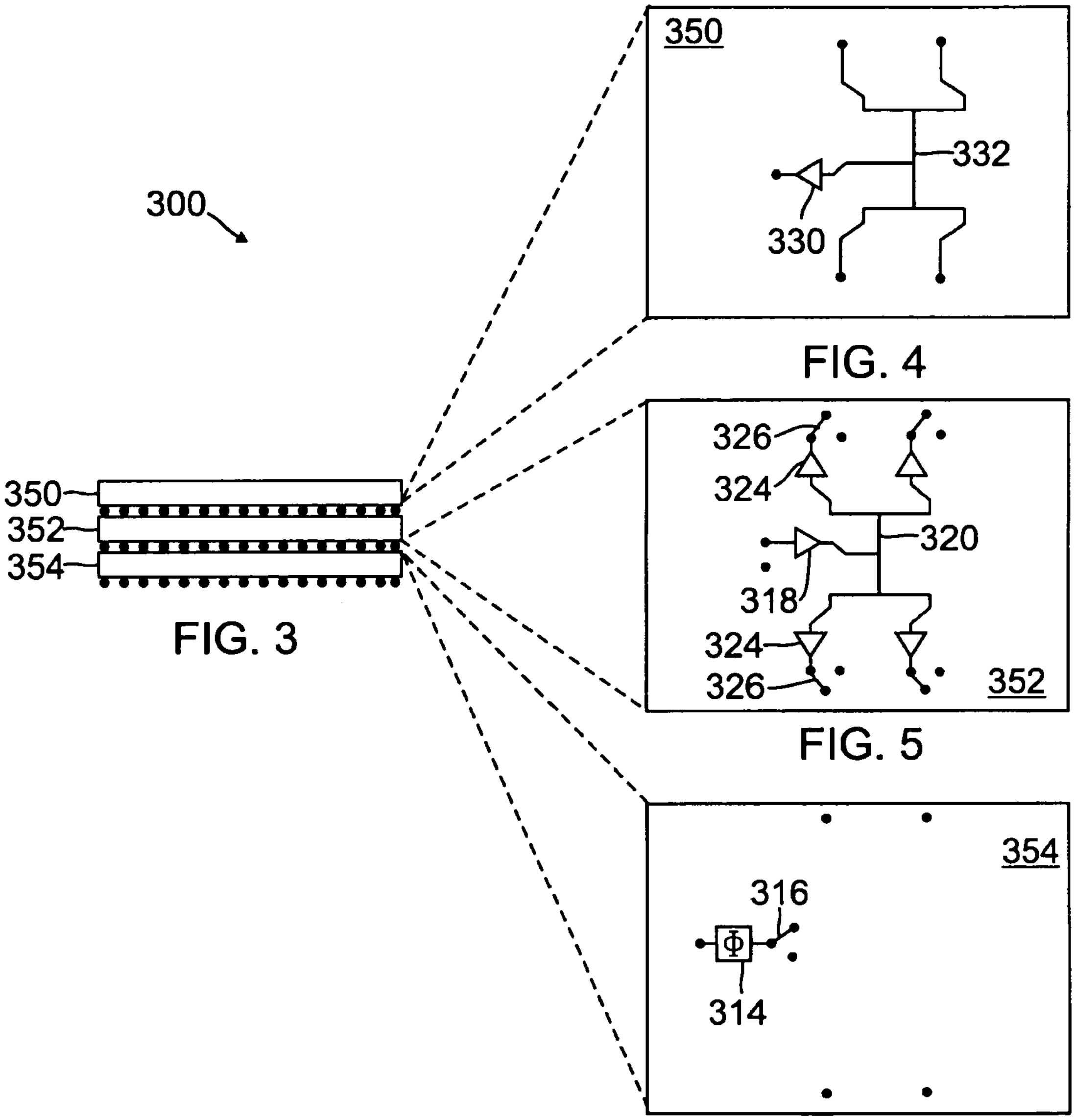
FIG. 3 is a side view of a multi-layer assembly implementation of an asymmetrically thinned four channel TR module in accordance with one embodiment of the present invention.
FIG. 4 is a top view illustrating a first layer of the multi-layer assembly of FIG. 3.
FIG. 5 is a top view illustrating a second layer of the multi-layer assembly of FIG. 3.
FIG. 6 is a top view illustrating a third layer of the multilayer assembly of FIG. 3.

FIG. 3 is a side view of a multi-layer assembly implementation 300 of an asymmetrically thinned four channel TR module in accordance with one embodiment of the present invention. The assembly 300 includes a first layer 350, a second layer 352, and a third layer 354. In various embodiments, each of the layers can include some or all of the components of a thinned TR module. In one embodiment, the three layers include some or all of the components of the asymmetrically thinned TR module of FIG. 2. In one embodiment, the assembly is a multi-layer wafer level package consisting of multiple semiconductor die layers. In some embodiments, layer to layer interconnects and component interconnects are implemented using plated vias and solder bumps. In other embodiments, other methods of coupling semiconductor die layers can be used.

In some embodiments, the asymmetrically thinned four channel TR module can be implemented on a single die made of silicon germanium. In one embodiment, the asymmetrically thinned four channel TR module can be implemented on a single silicon germanium die with a number of discrete devices coupled to the die. In a number of embodiments, the size of the die can be increased or decreased based on the number of components to be included.

FIG. 4 is a top view illustrating the first layer 350 of the multi-layer assembly 300 of FIG. 3. The first layer 350 includes the LNA 330 and the receive beamforming network (or power combiner circuit) 332. In a number of embodiments, the power combiner circuit 332 is implemented as a circuit trace disposed on the first layer 350. FIG. 5 is a top view illustrating the second layer 352 of the multi-layer assembly 300 of FIG. 3. The second layer includes the primary power amplifier 318, the transmit beamforming network (or power divider circuit) 320, the four secondary power amplifiers 324, and the four secondary TR switches 326. In some embodiments, the power divider circuit 320 is implemented as a circuit trace disposed on the second layer 352. FIG. 6 is a top view illustrating the third layer 354 of the multi-layer assembly 300 of FIG. 3. The third layer 354 includes the primary phase shifter 314 and the primary TR switch 316. In other embodiments, the layers can have other arrangements of the components for a thinned TR module.

In FIGS. 4-6, a number of dots representing connection points are shown. The dots can represent plated vias or other suitable layer to layer connections. In FIG. 5, the switches 326 are illustrated with three dots representing three switch contact points. The primary switch contact point of each switch 326 is closest to the edges of the second layer 352, as compared with the other two contact points (or secondary contact points). The two secondary switch contact points, for each switch 326, are coupled to each of the beamforming networks. More specifically, one secondary switch contact point is coupled to the transmit beamforming network, and the other is coupled to the receive beamforming network.

In some embodiments, the LNA can be made of any combination of gallium arsenide, indium phosphate, and/or antimonide based compound semiconductors. In various embodiments, the power amplifiers can be made of any combination of gallium arsenide, indium phosphate, and/or gallium nitride. In other embodiments, the components can be made of other suitable materials.

Figure 7:
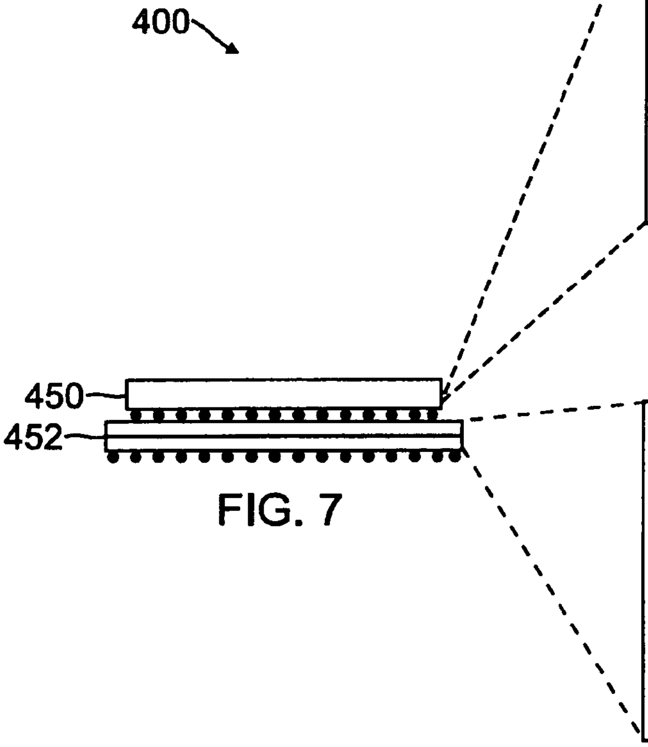
FIG. 7 is a side view of a two layer assembly implementation of an asymmetrically thinned four channel TR module in accordance with one embodiment of the present invention.

FIG. 7 is a side view of a two layer assembly implementation 400 of a four channel TR module in accordance with one embodiment of the present invention. The assembly 400 includes a first layer 450 and a second layer 452. In various embodiments, each of the layers can include some or all of the components of a thinned TR module. In one embodiment, the two layers include some or all of the components of the thinned TR module of FIG. 2. In one embodiment, the first layer is a single semiconductor die and the second layer is a chip scale package substrate. In such case, the semiconductor die can be mounted to the chip scale substrate using layer to layer interconnects such as plated vias and solder bumps. In other embodiments, other methods of coupling substrate layers can be used. In some embodiments, the chip scale package can include multiple layers including internal layers. In one such embodiment, components can be disposed on an internal layer of the chip scale package.

Figure 8:
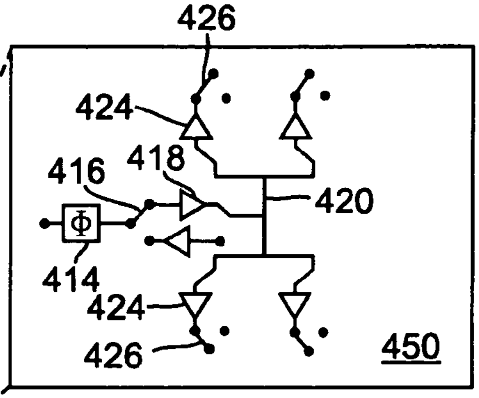
FIG. 8 is a top view illustrating a first layer of the two layer assembly of FIG. 7.
Figure 9:
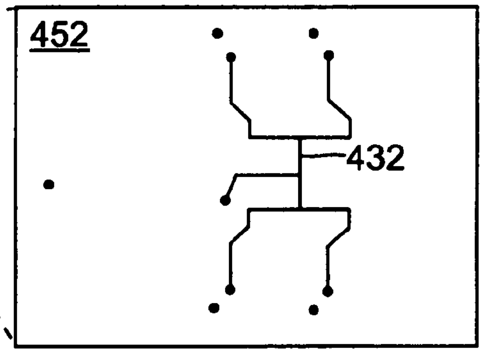
FIG. 9 is a top view illustrating a second layer of the two layer assembly of FIG. 7.

FIG. 8 is a top view illustrating the first layer 450 of the two layer assembly 400 of FIG. 7. The first layer 450 includes the primary phase shifter 414, the primary TR switch 416, the primary power amplifier 418, the transmit beamforming network (or power divider circuit) 420, the four secondary power amplifiers 424 and the four secondary TR switches 426. In some embodiments, the power divider circuit 420 is implemented as a circuit trace disposed on the first layer 450. FIG. 9 is a top view illustrating the second layer 452 of the two layer assembly 400 of FIG. 7. The second layer 452 includes the receive beamforming network (or power combiner circuit) 432. In some embodiments, the power combiner circuit 432 is implemented as a circuit trace disposed on the second layer 452. In some embodiments, the layers can have other arrangements of components for an asymmetrically thinned TR module.

In other embodiments, the asymmetrically thinned TR module can be implemented on a single layer or on more than three layers. In some embodiments, other circuit packaging variations can be used. In the embodiment illustrated in FIGS. 7-9, components sufficient for a four channel thinned TR module are shown. In other embodiments, more than or less than the illustrated number of components can be used to implement an asymmetrically thinned TR module. In some embodiments, the number of components varies with the number of channels supported by the thinned TR module. In one embodiment, for example, fewer components are used for a thinned TR module having less than four channels. In another embodiment, a greater number of components are used for a thinned TR module having more than four channels.

FIG. 10 is a isometric view of an airship 500 including an active array assembly 502 including multiple TR modules in accordance with one embodiment of the present invention. FIG. 11 is an exploded isometric view a portion 504 of the active array assembly 502 of FIG. 10.

In a number of embodiments, the TR modules are used in active array antennas. In other embodiments, the TR modules can be used in other wireless communication applications.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. An active antenna assembly comprising at least one multi-channel transmit/receive (TR) module for reducing power consumption, the antenna assembly comprising:
- the at least one TR module comprising:
  - a first phase shifter;
  - a first switch coupled to the first phase shifter, the first switch configured to switch between a transmit circuit and a receive circuit;
  - the transmit circuit comprising a plurality of first power amplifiers coupled to the first switch;
  - the receive circuit comprising a low noise amplifier coupled to the first switch and to a plurality of second switches;
  - wherein each of the second switches is configured to switch between one of the first power amplifiers and the low noise amplifier.

2. The antenna assembly of claim 1, wherein the transmit circuit further comprises a second power amplifier coupled in series between the first switch and the plurality of first power amplifiers.

3. The antenna assembly of claim 1, further comprising:
- a plurality of second phase shifters, each second phase shifter coupled to one of the second switches; and
- a plurality of radiating elements, each radiating element coupled to one of the second phase shifters.

4. The antenna assembly of claim 3, wherein each of the second phase shifters comprises at least two phase bits.

5. The antenna assembly of claim 1, wherein the first phase shifter comprises a 180 degree phase shifter.

6. The antenna assembly of claim 1, further comprising:
- a linear RF feed coupled to the first phase shifter;
- a planar RF feed coupled to the linear RF feed; and
- a circulator coupled to the planar RF feed.

7. The antenna assembly of claim 1, further comprising:
- four second phase shifters, each second phase shifter coupled to one of the second switches; and
- four radiating elements, each radiating element coupled to one of the second phase shifters;
- wherein the plurality of first power amplifiers comprises four power amplifiers; and
- wherein the plurality of second switches comprises four second switches.

8. A multi-channel transmit/receive (TR) module for reducing power consumption on receive, the TR module comprising:
- a first phase shifter;
- a first switch coupled to the first phase shifter, the first switch configured to switch between a transmit circuit and a receive circuit;
- the transmit circuit comprising:
  - four first power amplifiers; and
  - a power divider circuit for coupling the first switch to the four first power amplifiers; and
- the receive circuit comprising:
  - a low noise amplifier coupled to the first switch; and
  - a power combiner circuit for coupling the low noise amplifier to four second switches;
- wherein each of the four second switches is configured to switch between one of the first power amplifiers and the power combiner circuit.

9. The TR module of claim 8, wherein TR module is implemented using a single chip.

10. The TR module of claim 8, wherein the transmit circuit further comprises a second power amplifier coupled in series between the first switch and the four first power amplifiers.

11. The TR module of claim 10, further comprising an multi-layer assembly comprising:
- a first substrate layer comprising:
  - the low noise amplifier; and
  - the power combiner circuit;
- a second substrate layer comprising:
  - the second power amplifier;
  - the power divider circuit;
  - the first power amplifiers; and
  - the second switches; and
- a third substrate layer comprising:
  - the first phase shifter; and
  - the first switch.

12. The TR module of claim 11, wherein the multi-layer assembly further comprises:
- a plurality of vias for coupling the layers and at least two components on the layers; and
- a plurality of solder bumps for coupling the layers and at least two components on the layers.

13. The TR module of claim 11, further comprising a wafer level package comprising the first substrate layer, the second substrate layer, and the third substrate layer.

14. The TR module of claim 10, further comprising an multi-layer assembly comprising:
- a first layer comprising:
  - the first phase shifter;
  - the first switch;
  - the second power amplifier;
  - the power divider circuit;
  - the first power amplifiers;
  - the second switches; and
  - the low noise amplifier; and
- a second layer comprising the power combiner circuit.

15. The TR module of claim 14, wherein the multi-layer assembly further comprises:
- a plurality of vias for coupling the layers and at least two components on the layers; and a plurality of solder bumps for coupling the layers and at least two components on the layers.

16. The TR module of claim 14:

wherein a semiconductor die comprises the first layer; and wherein a chip scale package comprises the second layer.

17. The TR module of claim 8, further comprising:

four second phase shifters, each second phase shifter coupled to one of the second switches; and four radiating elements, each radiating element coupled to one of the second phase shifters.

* * * * *

UNITED STATES PATENT AND TRADEMARK OFFICE

CERTIFICATE OF CORRECTION

PATENT NO. : 7,876,263 B2
APPLICATION NO. : 12/391984
DATED : January 25, 2011
INVENTOR(S) : Clifton Quan It is certified that error appears in the above-identified patent and that said Letters Patent is hereby corrected as shown below:

In the Claims

| | |
|---|---|
| Column 8, Claim 9, line 25 | After "wherein" Insert -- the -- |
| Column 8, Claim 11, line 30 | Delete "an" Insert -- a -- |
| Column 8, Claim 14, line 52 | Delete "an" Insert -- a -- |
| Column 8, Claim 14, line 60 | After "switches;" Delete "and" |

Signed and Sealed this
Eleventh Day of October, 2011

David J. Kappos
*Director of the United States Patent and Trademark Office*